Patented Nov. 27, 1928.

1,693,284

UNITED STATES PATENT OFFICE.

MARTIN F. NEWMAN, OF OAKMONT, PENNSYLVANIA, ASSIGNOR TO WM. B. SCAIFE & SONS COMPANY, OF OAKMONT, PENNSYLVANIA, A CORPORATION OF PENNSYLVANIA.

PROCESS OF PREPARING NATURAL ZEOLITES.

No Drawing. Application filed June 8, 1925. Serial No. 35,825

This invention relates to the preparation of natural exchange silicates for use in water softening.

The objects of the invention are to improve the softening qualities of the natural exchange silicates treated; to remove some of the impurities; to fix certain other impurities in such form that they will not later be carried off by the water being treated; and particularly to so prepare the exchange silicates as to prevent the discoloration of water later treated therewith.

The zeolite process of softening water is well known. Certain silicates have the property when exposed to water of taking up the hardening elements, particularly lime and magnesium, and giving to the water in exchange for those hardening elements, sodium. Water passed over such material will therefore have lime and magnesium removed, and sodium substituted. After a certain time this exchange property of the silicates becomes considerably lessened, or even ended. The silicates are then treated with a salt solution, whereupon they take up sodium from the salt solution giving off the lime and magnesium, thus being restored to their original state.

Natural exchange silicates such as green sand, glauconite, greensand marl, etc., are found in different parts of the United States. These have heretofore been, after certain preparatory treatments, used for water softening by the above process. These natural materials ordinarily contain impurities part of which can be removed by washing, and a part of which appears to be practically inseparable. When these natural silicates are used for water softening, these inherent and inseparable impurities tend to disintegrate under the combined action of salt solution and softened water, making the treated water turbid and discoloring it.

I have discovered that by first thoroughly washing such natural exchange silicates as above mentioned with water to which cleansing agents have been added to remove impurities such as iron, clay, etc., and then placing the washed material in a retort and there subjecting it to the flow of superheated steam until it is entirely dried, the iron and some of the other inorganic impurities that cannot be washed out and that are not driven off appear to be fixed in combination with the silicates, so that they will not thereafter be given off to any appreciable degree in softening water or in the regenerating process when salt solution is applied. The steam used is superheated to 600° F. or higher, and at the end of the treatment, which may last as long as one hour, the dry material has a high temperature.

The above procedure may be varied by the addition of a chemical treatment as for example with solutions of borax or aluminum sulfate, after the washing and before applying superheated steam. Just what chemical or other action takes place as a result of the steam treatment is not clear, but there is a decided result different from that following treatment with saturated steam or dry roasting. Whereas saturated steam treated material usually gives a turbid effluent and roasted material a rusty effluent, the superheated steam treated material produces a clear and colorless effluent. At the same time the internal structure of the silicates seems to be improved so that the exchange properties thereof are enhanced, especially in the rate and uniformity of exchange, together with a greater coefficient of exchange.

I am aware that natural materials such as those referred to have been roasted or even treated with saturated steam, but these processes have had for their object, and effect, the removal of the iron and other impurities rather than the fixing of the impurities in combination to prevent removal.

I claim:

1. The process of preparing natural silicates such as greensand, greensand marl, and glauconite for use in water softening, comprising subjecting the material to the passage therethrough of superheated steam at a temperature of not less than 600° F. for an appreciable time.

2. The process of preparing natural silicates such as greensand, greensand marl, and glauconite for use in water softening, comprising washing the silicates to remove organic impurities, then washing them with chemicals to remove or fix inorganic impurities such as iron, and then subjecting them to passage of superheated steam until they are thoroughly heated and dried.

In testimony whereof, I sign my name.

MARTIN F. NEWMAN.